United States Patent
Taguchi

(10) Patent No.: US 11,215,443 B2
(45) Date of Patent: Jan. 4, 2022

(54) OPTICAL MEASUREMENT APPARATUS AND OPTICAL MEASUREMENT METHOD

(71) Applicant: Otsuka Electronics Co., Ltd., Osaka (JP)

(72) Inventor: Kunikazu Taguchi, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 17/033,996

(22) Filed: Sep. 28, 2020

(65) Prior Publication Data

US 2021/0123721 A1  Apr. 29, 2021

(30) Foreign Application Priority Data

Oct. 24, 2019 (JP) .............................. JP2019-193275

(51) Int. Cl.
G01B 11/06 (2006.01)
G01B 9/02 (2006.01)
G01N 21/84 (2006.01)

(52) U.S. Cl.
CPC ...... *G01B 11/0625* (2013.01); *G01B 9/02024* (2013.01); *G01N 21/8422* (2013.01); *G01N 2021/8427* (2013.01)

(58) Field of Classification Search
None
See application file for complete search history.

(56) References Cited

U.S. PATENT DOCUMENTS 5,747,813 A * 5/1998 Norton ............... G01B 11/0625
250/339.11
6,922,247 B2 7/2005 Inamoto et al.
(Continued)

FOREIGN PATENT DOCUMENTS

JP 2002-48730 A 2/2002
JP 4347504 B2 10/2009
(Continued)

*Primary Examiner* — Violeta A Prieto
(74) *Attorney, Agent, or Firm* — Studebaker & Brackett PC

(57) ABSTRACT

An optical measurement apparatus including: an irradiation optical system configured to irradiate, in a straight direction, a target area that includes a measurement area and a non-measurement area that is an area different from the measurement area, with irradiation light that includes a plurality of wavelengths; a reception optical system configured to receive measurement light that is transmission light or reflection light travelling from the target area as a result of the target area being irradiated with the irradiation light; and a calculation unit configured to generate a reception light spectrum that indicates a relationship between a wavelength and an intensity of the measurement light, for each position in the target area, based on a result of reception of the measurement light performed by the reception optical system, and calculate, for each wavelength, a transmittance or a reflectance of a measurement subject that is placed on the measurement area, based on the reception light spectrum thus generated, wherein the calculation unit calculates a transmittance spectrum or a reflectance spectrum of the measurement subject based on a first criterion spectrum that is the reception light spectrum that is based on the measurement light travelling from the measurement area when the measurement subject is not present on the measurement area, a second criterion spectrum that is the reception light spectrum that is based on the measurement light travelling from the non-measurement area, and a measurement spectrum that is the reception light spectrum that is based on the measurement light travelling from the measurement area when the measurement subject is present on the measurement area.

6 Claims, 15 Drawing Sheets

(56) References Cited

U.S. PATENT DOCUMENTS

| | | | |
|---|---|---|---|
| 10,288,412 B2 | 5/2019 | Inoue et al. | |
| 10,309,767 B2 | 6/2019 | Inoue et al. | |
| 2003/0147081 A1 | 8/2003 | Inamoto et al. | |
| 2011/0229696 A1* | 9/2011 | Ratnukumar | G07D 7/187 |
| | | | 428/172 |
| 2018/0347964 A1 | 12/2018 | Inoue et al. | |
| 2018/0347965 A1 | 12/2018 | Inoue et al. | |
| 2019/0353523 A1* | 11/2019 | Shinke | G01B 9/02044 |
| 2021/0223028 A1* | 7/2021 | Taguchi | G01B 11/0625 |

FOREIGN PATENT DOCUMENTS

| | | |
|---|---|---|
| JP | 5502227 B1 | 5/2014 |
| JP | 2015-017804 A | 1/2015 |
| JP | 2017-146288 A | 8/2017 |
| JP | 2018-205132 A | 12/2018 |
| JP | 2018-205295 A | 12/2018 |

* cited by examiner

OPTICAL MEASUREMENT APPARATUS AND OPTICAL MEASUREMENT METHOD

CROSS-REFERENCE TO RELATED APPLICATION

This application is based upon and claims the benefit of priority from Japanese patent application No. 2019-193275, filed on Oct. 24, 2019, the disclosure of which is incorporated herein in its entirety by reference.

BACKGROUND OF THE INVENTION

Field of the Invention

The present invention relates to an optical measurement apparatus and an optical measurement method.

Description of Related Art

In recent years, a technique has been known for measuring the film thickness distribution of a measurement subject, for example, by measuring the transmittance or the reflectance of the measurement subject based on transmission light or reflection light travelling from the measurement subject as a result of the measurement subject being irradiated with line light.

For example, JP 2017-146288A (Patent Document 1) discloses a film thickness distribution measurement method as described below. That is, the film thickness distribution measurement method is a film thickness distribution measurement method for measuring, with respect to a thin-film-attached wafer that has at least one thin film formed on a surface of a substrate, a film thickness distribution of the thin film, by using reflection spectroscopy that employs a line light source, the film thickness distribution measurement method including: a step of, by using a line light source longer than the diameter of the thin-film-attached wafer as the aforementioned line light source, scanning a surface of the thin-film-attached wafer with a linear light ray emitted from the line light source and detecting reflection light while irradiating a reference with a portion of the linear light ray and detecting reflection light from the reference; a step of correcting an intensity of the reflection light from the thin-film-attached wafer, using an intensity of the reflection light from the reference; and a step of calculating the film thickness distribution from the corrected intensity of the reflection light from the thin-film-attached wafer.

Also, JP 2015-17804A (Patent Document 2) discloses a film thickness distribution measurement method as described below. That is, the film thickness distribution measurement method is a film thickness distribution measurement method for measuring, with respect to a thin-film-attached wafer that has at least one thin film formed on a surface of a substrate, a film thickness distribution of the thin film, by using reflection spectroscopy that employs a line light source, the film thickness distribution measurement method including: a first step, a second step, and a third step, described below, of correcting incident angles at several points arranged in a direction of the line light source on the thin-film-attached wafer; and a fourth step of measuring a film thickness distribution of the thin film of the thin-film-attached wafer, using the corrected incident angles, wherein, in the first step, using a thin-film-attached wafer that has a thin film with a known film thickness, a reflectance is measured at a center point of the thin-film-attached wafer, and calculates a corrected incident angle at the center point of the wafer based on the measured reflectance and the known film thickness, in the second step, using a thin-film-attached wafer that has a thin film that is made of the same material as the thin film of the thin-film-attached wafer used in the first step and that is a measurement subject from which the film thickness distribution is to be measured, and the corrected incident angle at the center point of the wafer thus calculated, a film thickness distribution is measured at central position of the line light source in an area extending along a wafer central line while the thin-film-attached wafer is being moved in a wafer in-plane direction that is orthogonal to the line light source, and in the third step, the thin-film-attached wafer that has undergone the second step is rotated by 90°, thereafter the reflectance distribution in the area subjected to measurement in the second step are measured at the points arranged in the direction of the line light source, and the corrected incident angles at the points arranged in the direction of the line light source are measured from the measured reflectance distribution and the film thickness distribution measured in the second step.

There is a demand for a technique that makes it possible to more accurately measure the transmittance or reflectance of the measurement subject than such techniques disclosed in Patent Document 1 and Patent Document 2.

SUMMARY OF THE INVENTION

The present invention has been made to solve the above-described problems, and an object thereof is to provide an optical measurement apparatus and an optical measurement method that can more accurately measure the transmittance or the reflectance of a measurement subject.

(1) To solve the above-described problem, an optical measurement apparatus according to one aspect of the invention includes: an irradiation optical system configured to irradiate, in a straight direction, a target area that includes a measurement area and a non-measurement area that is an area different from the measurement area, with irradiation light that includes a plurality of wavelengths; a reception optical system configured to receive measurement light that is transmission light or reflection light travelling from the target area as a result of the target area being irradiated with the irradiation light; and a calculation unit configured to generate a reception light spectrum that indicates a relationship between a wavelength and an intensity of the measurement light, for each position in the target area, based on a result of reception of the measurement light performed by the reception optical system, and calculate, for each wavelength, a transmittance or a reflectance of a measurement subject that is placed on the measurement area, based on the reception light spectrum thus generated, wherein the calculation unit calculates a transmittance spectrum or a reflectance spectrum of the measurement subject based on a first criterion spectrum that is the reception light spectrum that is based on the measurement light travelling from the measurement area when the measurement subject is not present on the measurement area, a second criterion spectrum that is the reception light spectrum that is based on the measurement light travelling from the non-measurement area, and a measurement spectrum that is the reception light spectrum that is based on the measurement light travelling from the measurement area when the measurement subject is present on the measurement area.

As described above, with the configuration for calculating a transmittance spectrum or a reflectance spectrum of the measurement subject based on a first criterion spectrum that is based on the measurement light travelling from the measurement area when the measurement subject is not present on the measurement area, a second criterion spectrum that is based on the measurement light travelling from the non-measurement area, and a measurement spectrum that is based on the measurement light travelling from the measurement area when the measurement subject is present on the measurement area, it is possible to calculate the transmittance spectrum or the reflectance spectrum from the measurement spectrum, considering the effect of, for example, temporal changes in irradiation light intensity and photosensitivity caused due to a time difference between when the measurement subject is placed on the measurement area and when the measurement subject has not been placed, and variations in irradiation light intensity and photosensitivity caused due to a difference between irradiation positions in the measurement area and the non-measurement area. Therefore, it is possible to more accurately measure the transmittance spectrum or the reflectance spectrum of the measurement subject.

(2) Preferably, the second criterion spectrum is a spectrum generated by the calculation unit in advance based on the measurement light travelling from the non-measurement area when the measurement subject is not present on the measurement area, and the calculation unit calculates the transmittance spectrum or the reflectance spectrum of the measurement subject further based on a reference spectrum that is the reception light spectrum that is based on the measurement light travelling from the non-measurement area when the measurement subject is present on the measurement area.

With such a configuration, it is possible to more accurately estimate the reception light spectrum that is generated if the measurement subject is not present on the measurement area when the measurement spectrum is to be generated, based on the first criterion spectrum, the second criterion spectrum, and the reference spectrum, for example, and more accurately calculate the transmittance spectrum or the reflectance spectrum based on the reception light spectrum thus estimated.

(3) Preferably, the reference spectrum and the measurement spectrum are spectra generated by the calculation unit respectively based on the measurement light travelling from the non-measurement area and the measurement light travelling from the measurement area received by the reception optical system at the same point in time when the measurement subject is present on the measurement area.

With such a configuration, it is possible to reduce the effect of temporal changes in irradiation light intensity and photosensitivity caused due to a time difference between when the reference spectrum is generated and when the measurement spectrum is generated, for example, and therefore it is possible to more accurately calculate the transmittance spectrum or the reflectance spectrum, using such a reference spectrum.

(4) Preferably, the first criterion spectrum and the second criterion spectrum are spectra generated by the calculation unit respectively based on the measurement light travelling from the measurement area and the measurement light travelling from the non-measurement area received by the reception optical system at the same point in time when the measurement subject has not been present on the measurement area.

With such a configuration, it is possible to reduce the effect of temporal changes in irradiation light intensity and photosensitivity caused due to a time difference between when the first criterion spectrum is generated and when the second criterion spectrum is generated, for example, and therefore it is possible to more accurately calculate the transmittance spectrum or the reflectance spectrum, using such a first criterion spectrum and such a second criterion spectrum.

(5) Preferably, the calculation unit calculates the transmittance spectrum or the reflectance spectrum of the measurement subject based on the plurality of first criterion spectra that are respectively based on the rays of measurement light travelling from a plurality of positions on the measurement area when the measurement subject is not present on the measurement area, the second spectrum, and the plurality of measurement spectra that are respectively based on the rays of measurement light travelling from the plurality of positions.

With such a configuration, it is possible to measure the transmittance distribution or the reflectance distribution of the measurement subject on the measurement area.

(6) To solve the above-described problem, an optical measurement method according to one aspect of the invention includes: a step of irradiating, in a straight direction, a target area that includes a measurement area and a non-measurement area that is an area different from the measurement area, with irradiation light that includes a plurality of wavelengths; a step of receiving measurement light that is transmission light or reflection light travelling from the target area as a result of the target area being irradiated with the irradiation light; and a step of generating a reception light spectrum that indicates a relationship between a wavelength and an intensity of the measurement light, for each position in the target area, based on a result of reception of the measurement light, and calculating, for each wavelength, a transmittance or a reflectance of a measurement subject that is placed on the measurement area, based on the reception light spectrum thus generated, wherein, in the step of calculating the transmittance or the reflectance, a transmittance spectrum or a reflection spectrum of the measurement subject is calculated based on a first criterion spectrum that is the reception light spectrum that is based on the measurement light travelling from the measurement area when the measurement subject is not present on the measurement area, a second criterion spectrum that is the reception light spectrum that is based on the measurement light traveling from the non-measurement area, and a measurement spectrum that is the reception light spectrum that is based on the measurement light travelling from the measurement area when the measurement subject is present on the measurement area.

As described above, with the method for calculating a transmittance spectrum or a reflectance spectrum of the measurement subject based on a first criterion spectrum that is based on the measurement light travelling from the measurement area when the measurement subject is not present on the measurement area, a second criterion spectrum that is based on the measurement light travelling from the non-measurement area, and a measurement spectrum that is based on the measurement light travelling from the measurement area when the measurement subject is present on the measurement area, it is possible to calculate the transmittance spectrum or the reflectance spectrum from the measurement spectrum, considering the effect of, for example, temporal changes in irradiation light intensity and photosensitivity caused due to a time difference between when the measurement subject is placed on the measurement area and when the measurement subject has not been placed, and variations in irradiation light intensity and photosensitivity caused due to a difference between irradiation positions in the measurement area and the non-measurement area. Therefore, it is possible to more accurately measure the transmittance spectrum or the reflectance spectrum of the measurement subject.

According to the present invention, it is possible to more accurately measure the transmittance or the reflectance of a measurement subject.

The foregoing and other objects, features, aspects and advantages of the present invention will become more apparent from the following detailed description of the present invention when taken in conjunction with the accompanying drawings.

Figure 1:
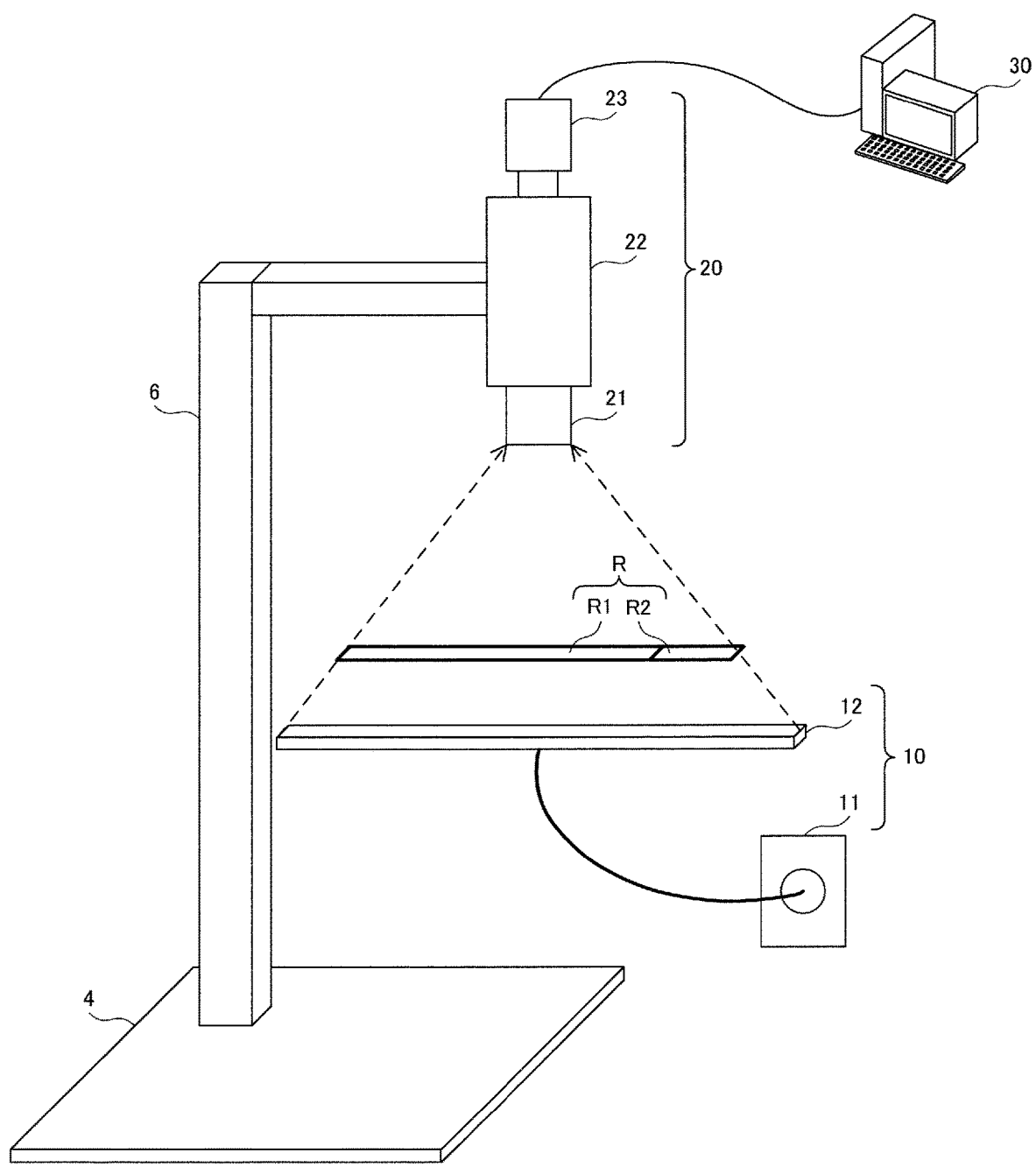
FIG. 1 is a diagram showing an example of a configuration of an optical measurement apparatus according to a first embodiment of the present invention.

Hereinafter, embodiments of the present invention will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

DETAILED DESCRIPTION OF THE INVENTION

First Embodiment

Optical Measurement Apparatus

FIG. 1 is a diagram showing an example of a configuration of an optical measurement apparatus according to a first embodiment of the present invention.

As shown in FIG. 1, an optical measurement apparatus 101 includes an irradiation optical system 10, a reception optical system 20, a processing device 30, a base member 4, and a support member 6. The base member 4 and the support member 6 fix the reception optical system 20. Note that the optical measurement apparatus 101 is not limited to having a configuration that includes the base member 4 and the support member 6, and may include other members for fixing the reception optical system 20 instead of the base member 4 and the support member 6 or in addition to the base member 4 and the support member 6.

Figure 2:
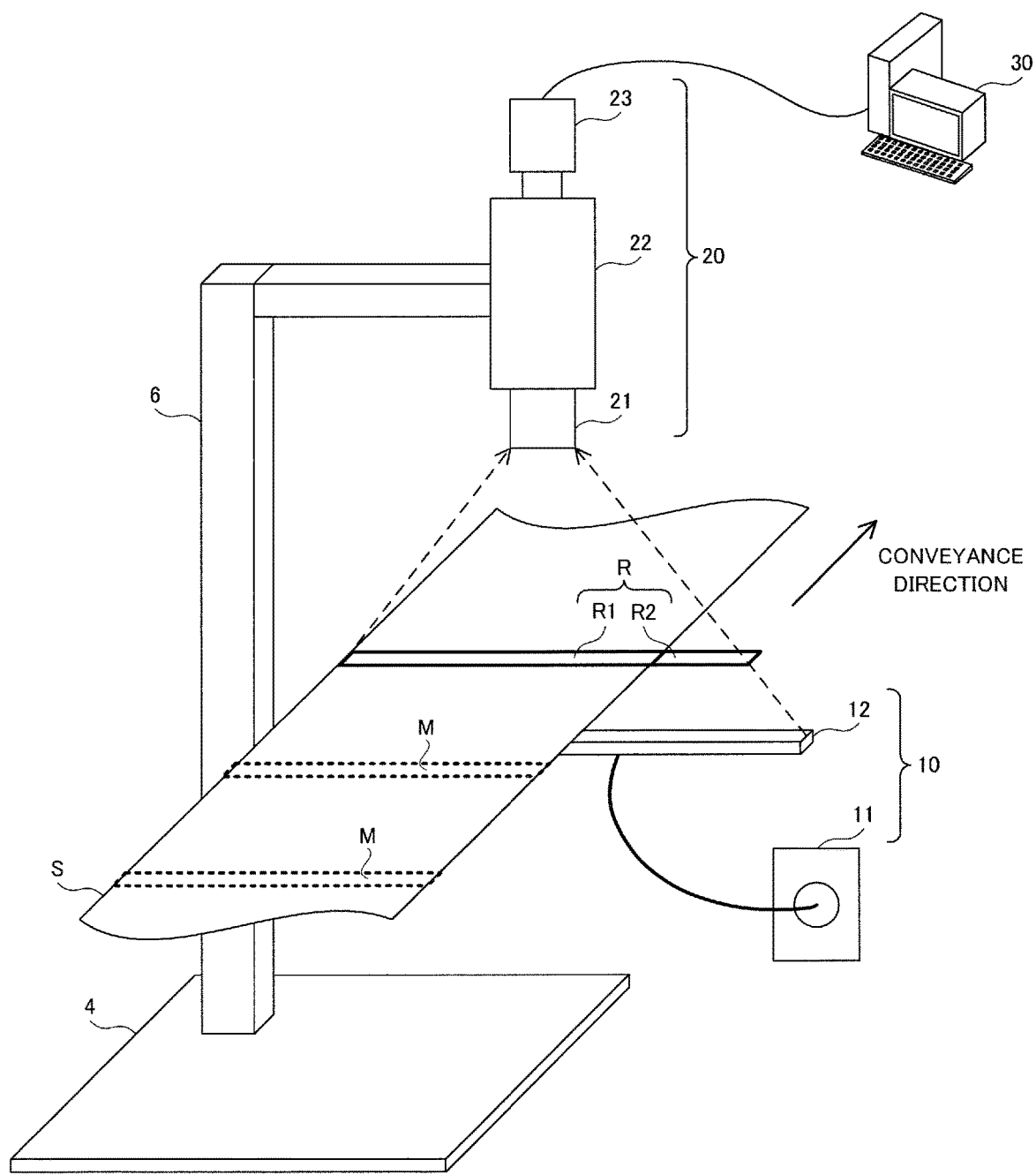
FIG. 2 is a diagram showing an example of a configuration of the optical measurement apparatus according to the first embodiment of the present invention.

FIG. 2 is a diagram showing an example of a configuration of the optical measurement apparatus according to the first embodiment of the present invention. FIG. 2 shows a state in which a measurement subject S that is the subject of measurement performed by the optical measurement apparatus 101 is placed.

As shown in FIG. 2, the optical measurement apparatus 101 measures the transmittance of the measurement subject S such as a film placed on a measurement area R1.

For example, in a production line of the measurement subject S, the optical measurement apparatus 101 automatically measures the transmittance spectrum of the measurement subject S that is conveyed through the measurement area R1, at a plurality of measurement positions M. That is to say, the optical measurement apparatus 101 performs in-line measurement of the transmittance spectrum at the plurality of measurement positions M on the measurement subject S.

More specifically, the optical measurement apparatus 101 periodically performs transmittance measurement, for example, to calculate, for each wavelength, the transmittance of the measurement subject S that is conveyed, at the measurement positions M.

Irradiation Optical System

The irradiation optical system 10 irradiates, in a straight direction, a target area R that includes a measurement area R1 and a non-measurement area R2 that is an area different from the measurement area R1, with irradiation light that includes a plurality of wavelengths.

More specifically, the irradiation optical system 10 irradiates, with irradiation light, the target area R that includes the measurement area R1, which is a linear area, and the non-measurement area R2, which is adjacent to the measurement area R1 at an end of the measurement area R1 in the longitudinal direction thereof.

The irradiation optical system 10 includes a light source 11 and a line light guide 12.

The light source 11 emits light that includes a plurality of wavelengths. The spectrum of light emitted by the light source 11 may be a continuous spectrum or a line spectrum. The wavelengths of light emitted by the light source 11 are set according to, for example, the range of wavelength information that is to be acquired from the measurement subject S. The light source 11 is a halogen lamp, for example.

The line light guide 12 receives light emitted from the light source 11 and emits the received light from a linear opening. Thus, the line light guide 12 irradiates the target area R with irradiation light in a straight direction. For example, a diffusion member for reducing unevenness in the amount of light is provided on the emission surface of the line light guide 12 from which irradiation light is emitted. The line light guide 12 is provided immediately below the surface on which the measurement subject S is conveyed.

For example, when performing in-line measurement of the transmittance spectrum of the measurement subject S, the irradiation optical system 10 irradiates the target area R with irradiation light at measurement points in time that are points in time when measurement is performed, while the irradiation optical system 10 stops irradiating the target area R with irradiation light at points in time other than the measurement points in time. Note that the irradiation optical system 10 may continuously irradiate the target area R with irradiation light regardless of the measurement points in time.

Reception Optical System

The reception optical system 20 receives measurement light that is transmission light travelling from the target area R as a result of the target area R being irradiated with irradiation light.

The reception optical system 20 includes an objective lens 21, an imaging spectroscope 22, and an imaging unit 23.

The reception optical system 20 is located so as to face the line light guide 12 with the measurement subject S being interposed therebetween.

The reception optical system 20 receives, as measurement light, transmission light passing through the target area R, of the irradiation light emitted from the line light guide 12. Specifically, the reception optical system 20 receives transmission light passing through the measurement subject S placed on the measurement area R1, of the irradiation light emitted from the line light guide 12.

Figure 3:
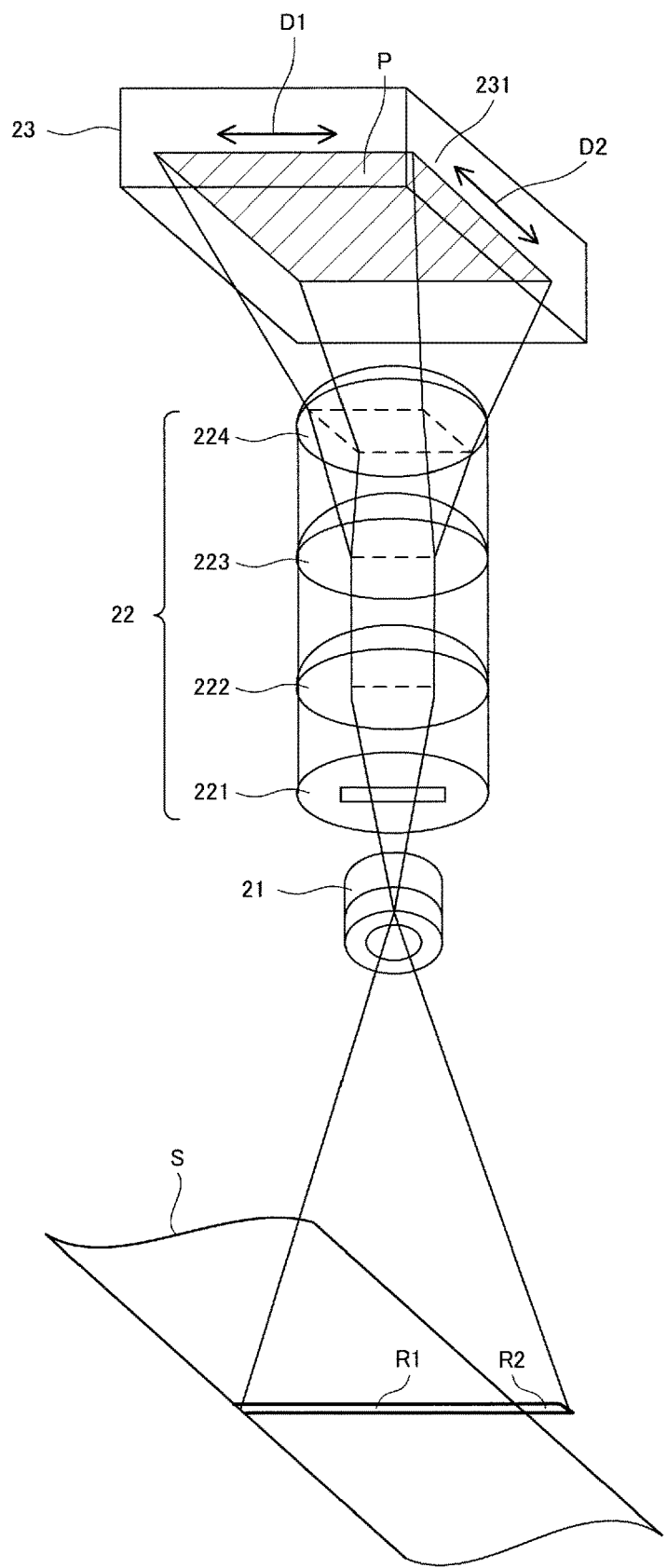
FIG. 3 is a diagram showing a configuration of the reception optical system included in the optical measurement apparatus according to the first embodiment of the present invention.

FIG. 3 is a diagram showing a configuration of the reception optical system included in the optical measurement apparatus according to the first embodiment of the present invention.

As shown in FIG. 3, the imaging spectroscope 22 includes a slit 221, a first lens 222, a diffraction grating 223, and a second lens 224. The slit 221, the first lens 222, the diffraction grating 223, and the second lens 224 are arranged in this order from the objective lens 21 side.

The imaging unit 23 is constituted by an imaging device 231 that has a two-dimensional light-receiving surface. Such imaging device 231 is a CCD (Charge Coupled Device) image sensor or a CMOS (Complementary Metal Oxide Semiconductor) image sensor, for example. The imaging unit 23 generates a two-dimensional image P based on the measurement light received from the imaging spectroscope 22. The two-dimensional image P generated by the imaging unit 23 includes wavelength information and position information.

The objective lens 21 converges and guides the measurement light from the target area R to the imaging spectroscope 22.

The slit 221 of the imaging spectroscope 22 shapes the beam cross section of the measurement light that has entered the slit 221 through the objective lens 21, into a predetermined shape. The length of the slit 221 in the longitudinal direction thereof is set according to the length of the target area R, and the width of the slit 221 in the lateral direction thereof is set according to the resolution of the diffraction grating 223, for example.

The first lens 222 of the imaging spectroscope 22 converts measurement light passing through the slit 221 into parallel light, and guides the converted measurement light to the diffraction grating 223. The first lens 222 is a collimating lens, for example.

The diffraction grating 223 of the imaging spectroscope 22 performs wavelength expansion on measurement light in a direction that is orthogonal to the longitudinal direction of the measurement light. More specifically, the diffraction grating 223 performs wavelength expansion on the linear measurement light passing through the slit 221, i.e. splits the linear measurement light, in a direction that is orthogonal to the line direction.

The second lens 224 of the imaging spectroscope 22 forms an image of the measurement light subjected to the wavelength expansion performed by the diffraction grating 223, on the light-receiving surface of the imaging device 231 included in the imaging unit 23 as a two-dimensional optical spectrum that reflects wavelength information and position information.

The imaging unit 23 transmits two-dimensional image data that represents the two-dimensional image P formed on the light-receiving surface of the imaging device 231, to the processing device 30, as the result of light reception performed in the reception optical system 20.

In the following description, the direction D1 of the two-dimensional image P shown in FIG. 3 is referred to as a "positional direction", and the direction D2 that is orthogonal to the positional direction is referred to as a "wavelength direction". Points in the positional direction respectively correspond to measurement points X on the target area R. Points in the wavelength direction respectively correspond to the wavelengths of measurement light from the measurement points X corresponding thereto. The light-receiving surface of the imaging device 231 has m channels as the resolution in the wavelength direction and n channels as the resolution in the positional direction. n is 1200, for example.

Processing Device

Figure 4:
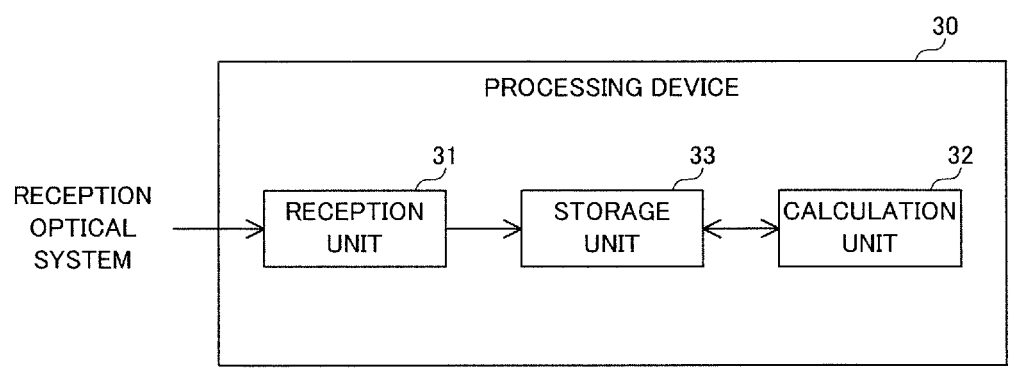
FIG. 4 is a diagram showing a configuration of the processing device included in the optical measurement apparatus according to the first embodiment of the present invention.

FIG. 4 is a diagram showing a configuration of the processing device included in the optical measurement apparatus according to the first embodiment of the present invention.

As shown in FIG. 4, the processing device 30 includes a reception unit 31, a calculation unit 32, and a storage unit 33. The reception unit 31 and the calculation unit 32 are, for example, realized by a processor such as CPU (Central Processing Unit) or DSP (Digital Signal Processor). The storage unit 33 is, for example, a non-volatile memory.

The reception unit 31 receives two-dimensional image data from the imaging unit 23 included in the reception optical system 20, and stores the received two-dimensional image data in the storage unit 33.

The calculation unit 32 generates a reception light spectrum $S(\lambda)$ that indicates the relationship between a wavelength $\lambda$ and the intensity of measurement light, for each position in the target area R, based on the result of reception of the measurement light performed by the reception optical system 20. Thereafter, the calculation unit 32 calculates, for each wavelength, the transmittance of the measurement subject S placed on the measurement area R1, based on the reception light spectrum $S(\lambda)$ thus generated.

More specifically, the calculation unit 32 generates the reception light spectrum $S(\lambda)$ based on the two-dimensional image data stored in the storage unit 33, and calculates the transmittance of the measurement subject S for each wavelength $\lambda$, based on the reception light spectrum $S(\lambda)$ thus generated.

The calculation unit 32 calculates the transmittance spectrum of the measurement subject S based on a first criterion spectrum $St1(\lambda)$ that is a reception light spectrum $S(\lambda)$ that is based on the measurement light travelling from the measurement area R1 when the measurement subject S is not present on the measurement area R1, a second criterion spectrum $St2(\lambda)$ that is a reception light spectrum $S(\lambda)$ that is based on the measurement light travelling from the non-measurement area R2, and a measurement spectrum $Stm(\lambda)$ that is a reception light spectrum $S(\lambda)$ that is based on the measurement light travelling from the measurement area R1 when the measurement subject S is present on the measurement area R1.

Figure 5:
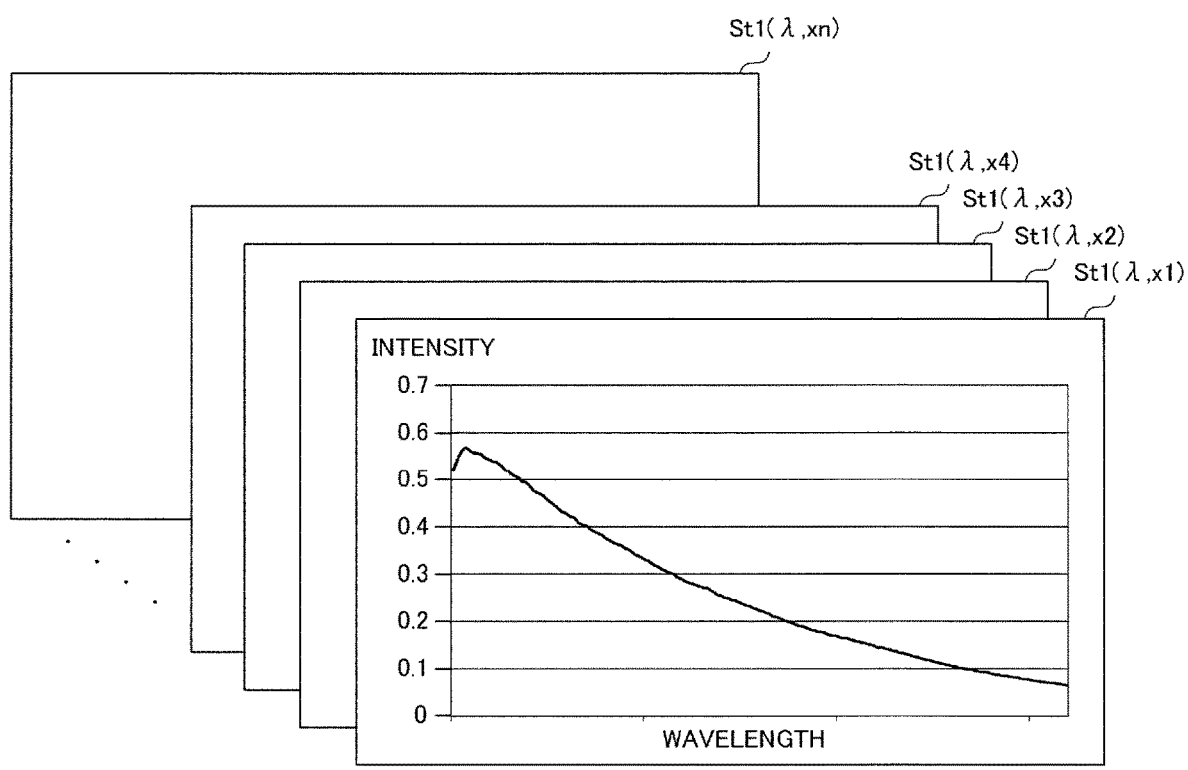
FIG. 5 is a diagram showing examples of first criterion spectra generated by the optical measurement apparatus according to the first embodiment of the present invention.

FIG. 5 is a diagram showing examples of first criterion spectra generated by the optical measurement apparatus according to the first embodiment of the present invention. In FIG. 5, the horizontal axis represents a wavelength and the vertical axis represents an intensity. FIG. 5 shows first criterion spectra $St1(\lambda,X)$ that are based on the transmission light travelling from n measurement points X on the measurement area R1.

As shown in FIG. 5, the calculation unit 32 generates a plurality of first criterion spectra $St1(\lambda,X)$ that are respectively based on the rays of measurement light travelling from a plurality of positions, i.e. the measurement points X, on the measurement area R1 when the measurement subject S is not present on the measurement area R1.

Thereafter, the calculation unit 32 calculates the transmittance spectrum of the measurement subject S based on the plurality of first criterion spectra $St1(\lambda,X)$ thus generated, the second criterion spectrum $St2(\lambda)$, and a plurality of measurement spectra $Stm(\lambda,X)$ that are respectively based on the rays of measurement light travelling from the plurality of measurement points X.

For example, the calculation unit 32 calculates the transmittance distribution of the measurement subject S at the measurement positions M based on the first criterion spectra $St1(\lambda,X)$, the second criterion spectrum $St2(\lambda)$, and the measurement spectra $Stm(\lambda,X)$.

More specifically, using the first criterion spectra $St1(\lambda,X)$ and the second criterion spectrum $St2(\lambda)$ as reference data, the calculation unit 32 calculates the transmittance distribution of the measurement subject S at the measurement positions M based on the reference data and the measurement spectra $Stm(\lambda,X)$.

Figure 6:
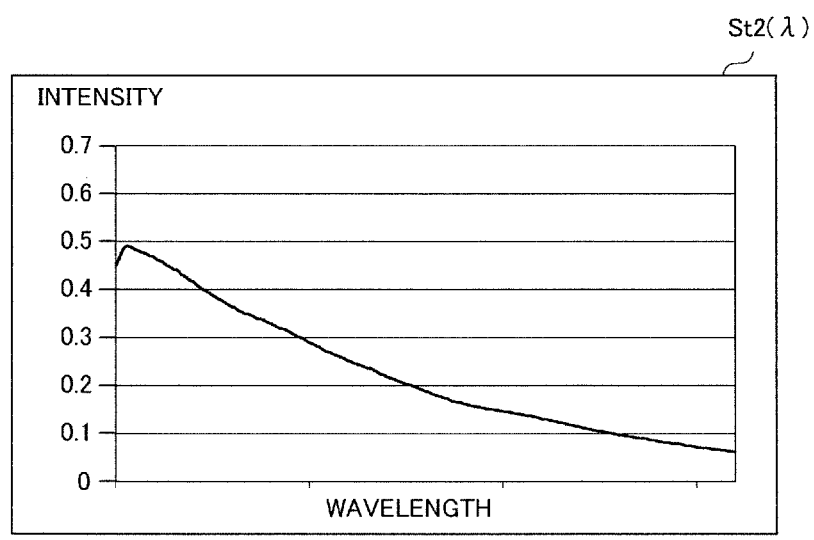
FIG. 6 is a diagram showing an example of the second criterion spectrum generated by the optical measurement apparatus according to the first embodiment of the present invention.

FIG. 6 is a diagram showing an example of the second criterion spectrum generated by the optical measurement apparatus according to the first embodiment of the present invention. In FIG. 6, the horizontal axis represents a wavelength and the vertical axis represents an intensity. FIG. 6 shows the second criterion spectrum $St2(\lambda)$ that is based on the transmission light travelling from the non-measurement area R2.

For example, the second criterion spectrum $St2(\lambda)$ is a spectrum generated by the calculation unit 32 in advance based on the measurement light travelling from the non-measurement area R2 when the measurement subject S is not present on the measurement area R1.

For example, the first criterion spectra $St1(\lambda,X)$ and the second criterion spectrum $St2(\lambda)$ are spectra generated by the calculation unit 32 respectively based on the measurement light travelling from the measurement area R1 and the measurement light travelling from the non-measurement area R2 received by the reception optical system 20 at the same point in time when the measurement subject S has not been present on the measurement area R1.

More specifically, the first criterion spectra $St1(\lambda,X)$ and the second criterion spectrum $St2(\lambda)$ are spectra generated by the calculation unit 32 respectively based on the transmission light from the measurement area R1 and the transmission light from the non-measurement area R2 received by the reception optical system 20 as a result of the target area R being irradiated by the irradiation optical system 10 with irradiation light in a state where the measurement subject S is not present on the measurement area R1.

For example, in a state where in-line measurement of the transmittance distribution of the measurement subject S has not been started and the measurement subject S has not been placed on the measurement area R1, the calculation unit 32 generates the first criterion spectra $St1(\lambda,X)$ and the second criterion spectrum $St2(\lambda)$ based on the transmission light from the measurement area R1 and the transmission light from the non-measurement area R2 received by the reception optical system 20 at the same point in time as a result of the target area R being irradiated by the irradiation optical system 10 with irradiation light.

Here, the reception light spectrum $S(\lambda)$ calculated by the calculation unit 32 are affected by variations in the intensity of irradiation light, which depends on the irradiation position of irradiation light from the irradiation optical system 10, and variations in the sensitivity of the imaging device 231, which depends on the reception position thereof.

Therefore, as shown in FIGS. 5 and 6, the first criterion spectrum $St1(\lambda,x1)$ and the second criterion spectrum $St2(\lambda)$, for example, differ from each other due to the effect of, for example, the aforementioned variations in the intensity of irradiation light and variations in sensitivity.

Also, the intensity of irradiation light from the irradiation optical system 10 and the photosensitivity of the reception optical system 20 change over time, i.e. exhibit temporal changes.

Figure 7:
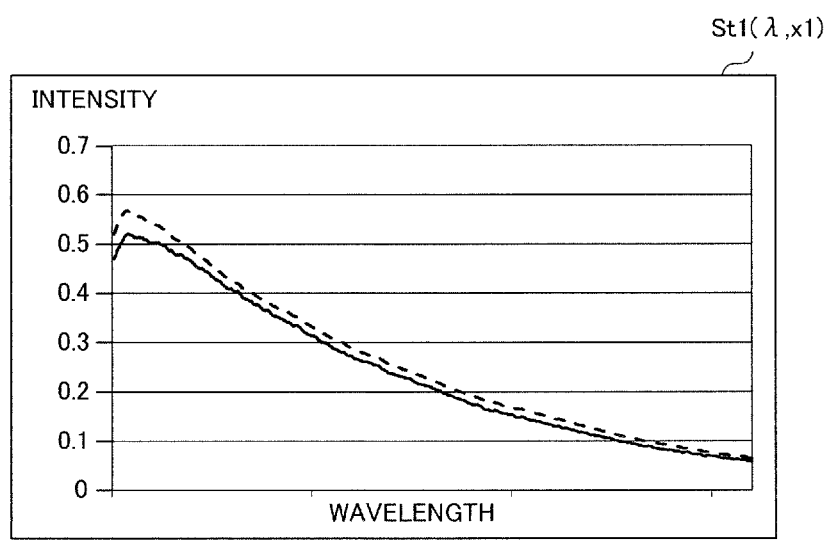
FIG. 7 is a diagram showing another example of the first criterion spectrum generated by the optical measurement apparatus according to the first embodiment of the present invention.

FIG. 7 is a diagram showing another example of the first criterion spectrum generated by the optical measurement apparatus according to the first embodiment of the present invention. In FIG. 7, the horizontal axis represents a wavelength and the vertical axis represents an intensity. The dashed line in FIG. 7 indicates the first criterion spectrum $St1(\lambda,x1)$ corresponding to the measurement point x1 in FIG. 5, and the solid line in FIG. 7 indicates a first criterion spectrum $St1(\lambda,x1)$ measured at a measurement point in time that is different from the measurement point in time of the first criterion spectrum $St1(\lambda,x1)$ shown in FIG. 5.

Figure 8:
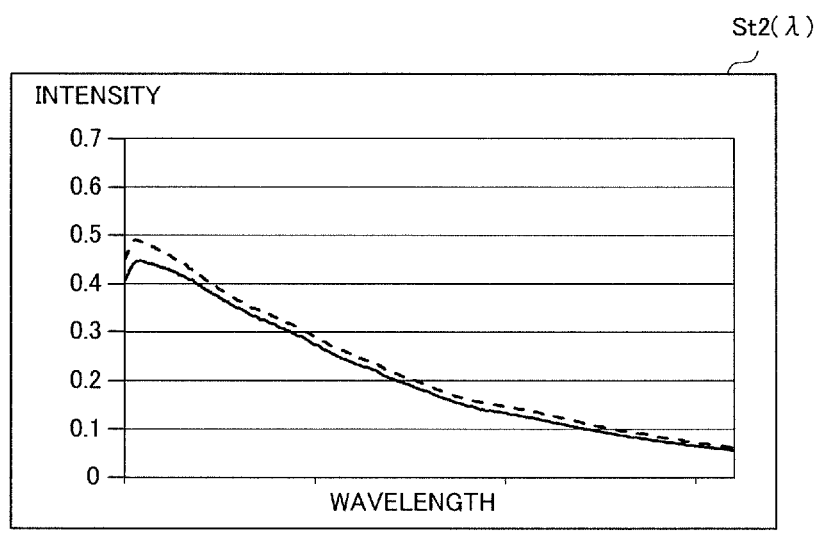
FIG. 8 is a diagram showing another example of the second criterion spectrum generated by the optical measurement apparatus according to the first embodiment of the present invention.

FIG. 8 is a diagram showing another example of the second criterion spectrum generated by the optical measurement apparatus according to the first embodiment of the present invention. In FIG. 8, the horizontal axis represents a wavelength and the vertical axis represents an intensity. The dashed line in FIG. 8 indicates the second criterion spectrum $St2(\lambda)$ shown in FIG. 6, and the solid line in FIG. 8 indicates a second criterion spectrum $St2(\lambda)$ measured at a measurement point in time that is different from the measurement point in time of the second criterion spectrum $St2(\lambda)$ shown in FIG. 6.

As shown in FIG. 7, the intensity of the first criterion spectrum St1(λ,x1) changes depending on the measurement point in time due to the effect of, for example, the aforementioned variations in the intensity of irradiation light over time and variations in the photosensitivity over time.

Also as shown in FIG. 8, the intensity of the second criterion spectrum St2(λ) changes depending on the measurement point in time due to the effect of, for example, the aforementioned variations in the intensity of irradiation light over time and variations in the photosensitivity over time.

Therefore, for example, in a case where in-line measurement of the transmittance distribution of an elongated measurement subject S is performed for a long time while the measurement subject S is conveyed, with a method for calculating the transmittance spectrum based on the first criterion spectra St1(λ,X) and the second criterion spectrum St2(λ) generated before the in-line measurement is started and the measurement spectra Stm(λ,X) generated during the in-line measurement, the transmittance spectrum thus calculated may vary due to the effect of, for example, the aforementioned changes in irradiation light intensity over time and changes in photosensitivity over time.

Therefore, the calculation unit 32 calculates the transmittance spectrum of the measurement subject S further based on a reference spectrum Str(λ) that is a reception light spectrum that is based on the measurement light travelling from the non-measurement area R2 when the measurement subject S is present on the measurement area R1.

More specifically, using the first criterion spectra St1(λ,X) and the second criterion spectrum St2(λ), the calculation unit 32 corrects the reference spectrum Str(λ) to generate virtual reference spectra Stv(λ,X) that are virtual reference data regarding the measurement area R1, in which variations and changes in the reception light spectrum S(λ) are considered. The calculation unit 32 calculates the transmittance spectrum of the measurement subject S based on the virtual reference spectra Stv(λ,X) thus generated and the measurement spectra Stm(λ,X).

The reference spectrum Str(λ) and the measurement spectra Stm(λ,X) are, for example, spectra generated by the calculation unit 32 respectively based on the measurement light travelling from the non-measurement area R2 and the measurement light travelling from the measurement area R1 received by the reception optical system 20 at the same point in time when the measurement subject S is present on the measurement area R1.

More specifically, the reference spectrum Str(λ) and the measurement spectra Stm(λ,X) are spectra generated by the calculation unit 32 respectively based on the transmission light from the non-measurement area R2 and the transmission light from the measurement area R1, i.e. from the measurement subject S, received by the reception optical system 20 as a result of the target area R being irradiated by the irradiation optical system 10 with irradiation light in a state where the measurement subject S is present on the measurement area R1.

For example, after in-line measurement of the transmittance distribution of the measurement subject S has been started, in a state where the measurement subject S is placed on the measurement area R1, the calculation unit 32 generates the reference spectrum Str(λ) and the measurement spectra Stm(λ,X) based on the transmission light from the non-measurement area R2 and the transmission light from the measurement area R1 received by the reception optical system 20 at the same point in time as a result of the target area R being irradiated by the irradiation optical system 10 with irradiation light.

Figure 9:
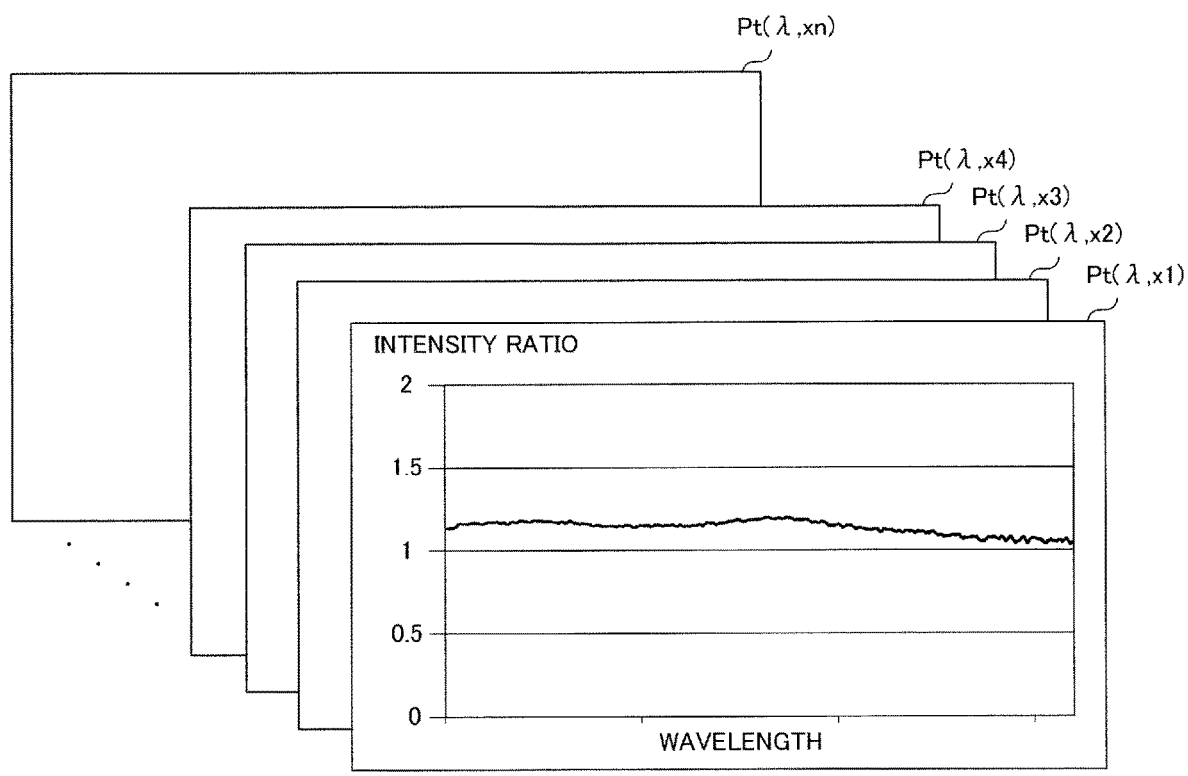
FIG. 9 is a diagram showing intensity ratios between the first criterion spectra and the second reference spectrum generated by the optical measurement apparatus according to the first embodiment of the present invention.

FIG. 9 is a diagram showing intensity ratios between the first criterion spectra and the second reference spectrum generated by the optical measurement apparatus according to the first embodiment of the present invention. In FIG. 9, the horizontal axis represents a wavelength and the vertical axis represents an intensity ratio.

For example, the storage unit 33 stores intensity ratios Pt(λ,X) that are ratios between first criterion spectra St1(λ,t,X) and second criterion spectrum St2(λ,t) generated at the measurement points X for wavelengths λ at a certain point t in time (t=t0) before the start of in-line measurement. The intensity ratios Pt(λ,X) are expressed by Formula (1) below.

[Math. 1]

$$Pt(\lambda, X) = \frac{St1(\lambda, t, X)}{St2(\lambda, t)} \quad (1)$$

Upon generating measurement spectra Stm(λ,t,X) and a reference spectrum Str(λ,t) at a certain point t in time (t=t1) after the start of in-line measurement, the calculation unit 32 acquires the intensity ratios Pt(λ,X) stored in the storage unit 33, and calculates transmittance spectra ST(λ,t,X) that indicate the transmittances of the measurement subject S at the plurality of measurement points X, as expressed by Formula (3) below, using the virtual reference spectra Stv(λ,t,X) expressed by Formula (2) below.

[Math. 2]

$$Stv(\lambda, t, X) = Str(\lambda, t) \times Pt(\lambda, X) \quad (2)$$

[Math. 3]

$$ST(\lambda, t, X) = \frac{Stm(\lambda, t, X)}{Stv(\lambda, t, X)} \quad (3)$$

Figure 10:
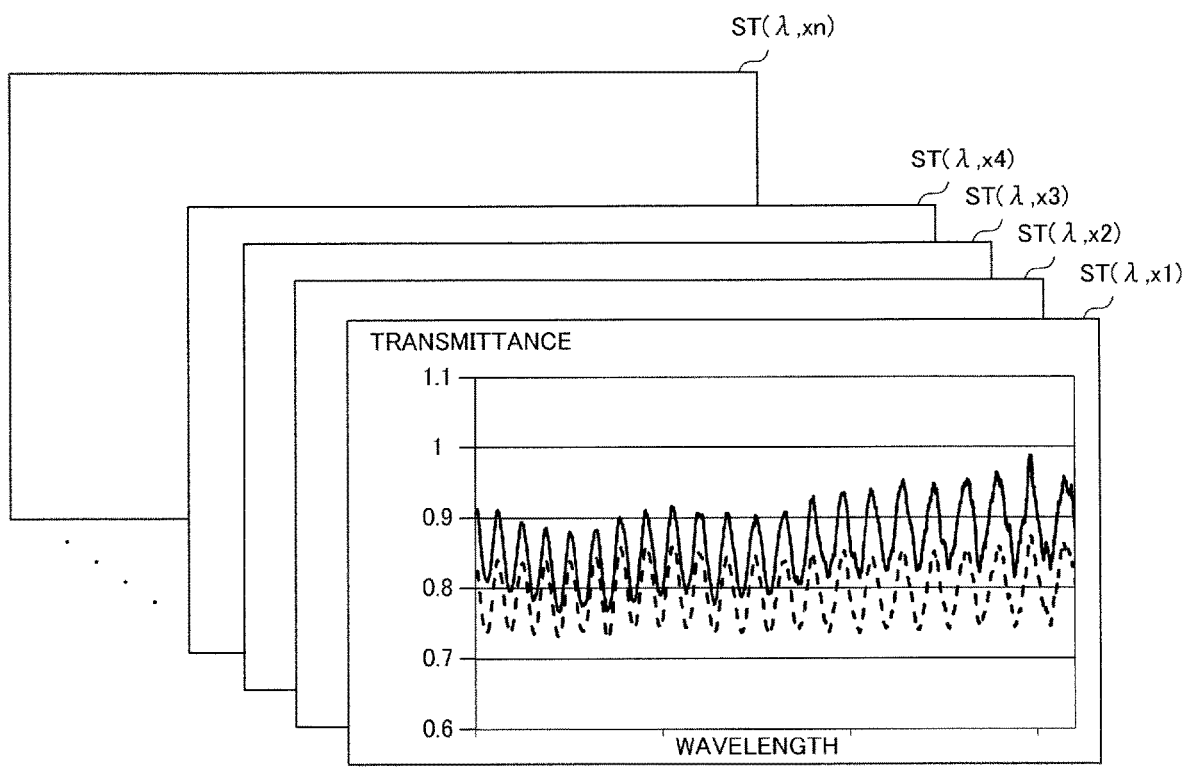
FIG. 10 is a diagram showing transmittance spectra generated by the optical measurement apparatus according to the first embodiment of the present invention.

FIG. 10 is a diagram showing transmittance spectra generated by the optical measurement apparatus according to the first embodiment of the present invention. In FIG. 10, the horizontal axis represents a wavelength and the vertical axis represents a transmittance. The solid line in FIG. 10 indicates a transmittance spectrum ST(λ,t,X) calculated based on an virtual reference spectrum Stv(λ,t,X) and a measurement spectrum Stm(λ,t,X), and the dashed line in FIG. 10 indicates a transmittance spectrum calculated based on a first criterion spectrum St1(λ,t,X) and a measurement spectrum Stm(λ,t,X) as a comparative example.

As shown in FIG. 10, using the virtual reference spectra Stv(λ,t,X) instead of the first criterion spectra St1(λ,t,X), it is possible to calculate transmittance spectra ST(λ,t,X) that are different from the transmittance spectra calculated when the first criterion spectra St1(λ,t,X) are used.

For example, the calculation unit 32 calculates the film thickness distribution that indicates the film thickness of the measurement subject S at the measurement points X, based on the transmittance spectra ST(λ,t,X) thus calculated. Alternatively, the calculation unit 32 calculates the hue of the measurement subject S based on the transmittance spectra ST(λ,t,X) thus calculated.

Operation Flow

The optical measurement apparatus according to the embodiment of the present invention is provided with a computer that includes a memory, and a calculation unit such as a CPU of the computer reads out a program that includes some or all of the steps of the following flowchart and sequence from the memory, and executes the program. The program for this apparatus can be installed from the outside. The program for this apparatus is distributed in a state of being stored in a recording medium.

Figure 11:
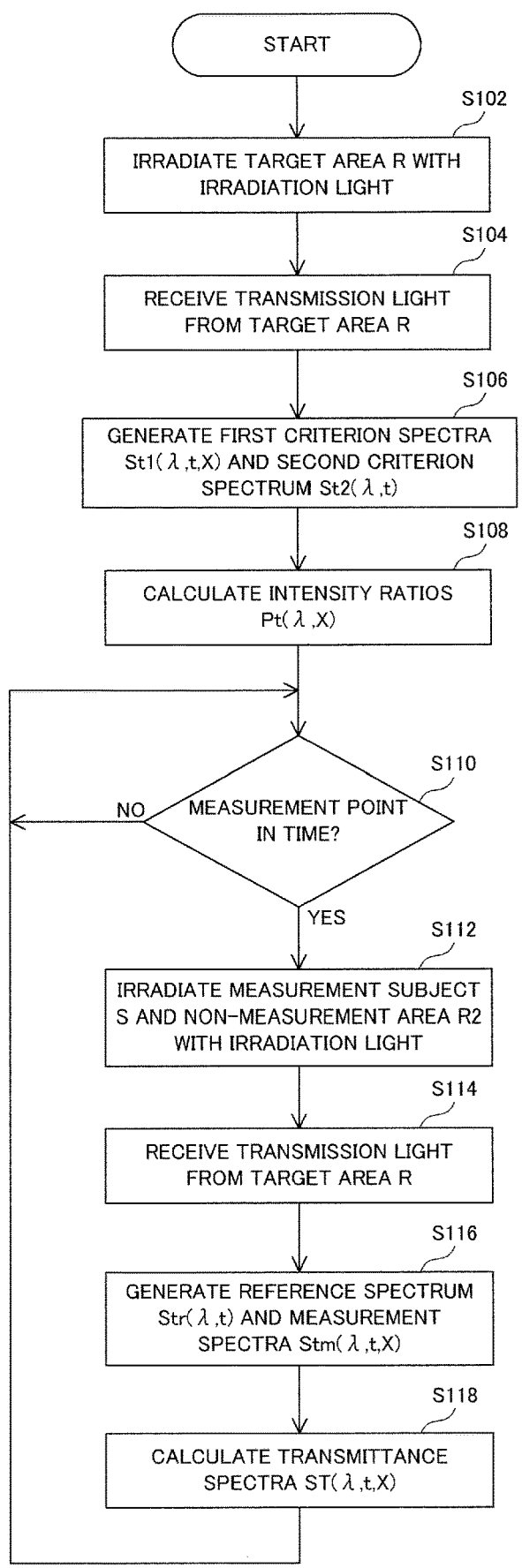
FIG. 11 is a flowchart defining an example of an operation procedure performed when the transmittance spectrum of the measurement subject is calculated by the optical measurement apparatus according to the first embodiment of the present invention.

FIG. 11 is a flowchart defining an example of an operation procedure performed when the transmittance spectrum of the measurement subject is calculated by the optical measurement apparatus according to the first embodiment of the present invention.

As shown in FIG. 11, before starting in-line measurement of the transmittance distribution of the measurement subject S, the optical measurement apparatus 101 first irradiates, in a straight direction, the target area R, which includes the measurement area R1 and the non-measurement area R2, with irradiation light that includes a plurality of wavelengths, in a state where the measurement subject S is not placed on the measurement area R1 (step S102).

Next, the optical measurement apparatus 101 receives the measurement light, i.e. the transmission light, travelling from the target area R as a result of the target area R being irradiated with irradiation light (step S104).

Next, the optical measurement apparatus 101 generates first criterion spectra St1($\lambda$,t,X) and the second criterion spectrum St2($\lambda$,t) based on the result of reception of measurement light (step S106).

Next, the optical measurement apparatus 101 calculates the intensity ratios Pt($\lambda$,X) between the first criterion spectra St1($\lambda$,t,X) and the second criterion spectrum St2($\lambda$,t), and stores the intensity ratios Pt($\lambda$,X) thus calculated, in the storage unit 33 (step S108).

Next, after starting in-line measurement, the optical measurement apparatus 101 waits until a measurement point in time, which is a point in time at which measurement is to be performed (NO in step S110), and at the measurement point in time (YES in step S110), the optical measurement apparatus 101 irradiates the target area R with irradiation light in a straight direction. Specifically, the optical measurement apparatus 101 irradiates the measurement subject S and the non-measurement area R2 with irradiation light in a straight direction (step S112).

Next, the optical measurement apparatus 101 receives the measurement light, i.e. the transmission light, travelling from the target area R as a result of the target area R being irradiated with irradiation light. Specifically, the optical measurement apparatus 101 receives transmission light passing through the measurement subject S and transmission light travelling from the non-measurement area R2 (step S114).

Next, the optical measurement apparatus 101 generates the reference spectrum Str($\lambda$,t) and the measurement spectra Stm($\lambda$,t,X) based on the result of reception of measurement light (step S116).

Next, the optical measurement apparatus 101 calculates the transmittance spectra ST($\lambda$,t,X) of the measurement subject S at the measurement positions M based on the virtual reference spectra Stv($\lambda$,t,X), which area calculated based on the reference spectrum Str($\lambda$,t) and the intensity ratios Pt($\lambda$,X), and the measurement spectra Stm($\lambda$,t,X) (step S118).

Next, the optical measurement apparatus 101 waits until the next measurement point in time (NO in step S110).

Note that although the irradiation optical system 10 in the optical measurement apparatus 101 according to the embodiment of the present invention is configured to irradiate, with irradiation light, the target area R that includes the measurement area R1 and the non-measurement area R2 that is adjacent to the measurement area R1 at one end of the measurement area R1 in the longitudinal direction thereof, the present invention is not limited to such a configuration. The irradiation optical system 10 may be configured to irradiate, with irradiation light, a target area R that includes a measurement area R1, a non-measurement area R2a that is adjacent to the measurement area R1 at one end of the measurement area R1 in the longitudinal direction thereof, and a non-measurement area R2b that is adjacent to the measurement area R1 at the other end of the measurement area R1 in the longitudinal direction thereof.

If this is the case, for example, the calculation unit 32 calculates the average values of a reception light spectrum that is based on the measurement light travelling from the non-measurement area R2a and a reception light spectrum that is based on the measurement light travelling from the non-measurement area R2b as the second criterion spectrum St2($\lambda$) or St2($\lambda$,t). Also, for example, the calculation unit 32 calculates the average values of a reception light spectrum that is based on the measurement light travelling from the non-measurement area R2a and a reception light spectrum that is based on the measurement light travelling from the non-measurement area R2b when the measurement subject S is present on the measurement area R1 as the reference spectrum Str($\lambda$) or Str($\lambda$,t).

Also, although the calculation unit 32 in the optical measurement apparatus 101 according to the embodiment of the present invention is configured to generate the second criterion spectrum St2($\lambda$) or St2($\lambda$,t) based on transmission light travelling from the non-measurement area R2 received as a result of the target area R being irradiated with irradiation light in a state where the measurement subject S is not placed on the measurement area R1, the present invention is not limited to such a configuration. The calculation unit 32 may be configured to generate the second criterion spectrum St2($\lambda$) or St2($\lambda$,t) based on transmission light travelling from the non-measurement area R2 received as a result of the target area R being irradiated with irradiation light in a state where the measurement subject S is placed on the measurement area R1. That is to say, the calculation unit 32 may be configured to generate the second criterion spectrum St2($\lambda$) or St2($\lambda$,t) at a point in time that is different from the point in time at which the calculation unit 32 generates the reference spectrum Str($\lambda$) or Str($\lambda$,t) after the start of in-line measurement of the transmittance distribution of the measurement subject S, for example.

Also, although the calculation unit 32 in the optical measurement apparatus 101 according to the embodiment of the present invention is configured to generate the reference spectrum Str($\lambda$) or Str($\lambda$,t) and the measurement spectra Stm($\lambda$,X) or Stm($\lambda$,t,X) based on the transmission light from non-measurement area R2 and the transmission light from the measurement area R1 received by the reception optical system 20 at the same point in time as a result of the target area R being irradiated by the irradiation optical system 10 with the irradiation light in a state where the measurement subject S is placed on the measurement area R1, the present invention is not limited to such a configuration. The calculation unit 32 may be configured to generate the reference spectrum Str($\lambda$) or Str($\lambda$,t) and the measurement spectra Stm($\lambda$,X) or Stm($\lambda$,t,X) based on transmission light received by the reception optical system 20 at different points in time.

Also, although the calculation unit 32 in the optical measurement apparatus 101 according to the embodiment of the present invention is configured to generate the first criterion spectra St1($\lambda$,X) or St1($\lambda$,t,X) and the second criterion spectrum St2($\lambda$) or St2($\lambda$,t) based on the transmission light from the measurement area R1 and the transmission light from the non-measurement area R2 received by the reception optical system 20 at the same point in time as a result of the target area R being irradiated by the irradiation optical system 10 with irradiation light in a state where the measurement subject S is not placed on the measurement area R1, the present invention is not limited to such a configuration. The calculation unit 32 may be configured to generate the first criterion spectra St1($\lambda$,X) or St1($\lambda$,t,X) and the second criterion spectrum St2($\lambda$) or St2($\lambda$,t) based on transmission light received by the reception optical system 20 at different points in time in a state where the measurement subject S is not placed on the measurement area R1.

Also, although the calculation unit 32 in the optical measurement apparatus 101 according to the embodiment of the present invention is configured to calculate the transmittance spectra ST($\lambda$,X) or ST($\lambda$,t,X) of the measurement subject S at the plurality of measurement points X based on the plurality of first criterion spectra St1($\lambda$,X) or St1($\lambda$,t,X) that are respectively based on the rays of measurement light travelling from the plurality of measurement points X in the measurement area R1, the second criterion spectrum St2($\lambda$) or St2($\lambda$,t), and the plurality of measurement spectra Stm($\lambda$,X) or Stm($\lambda$,t,X) that are respectively based on the rays of measurement light travelling from the plurality of measurement points X, the present invention is not limited to such a configuration. The calculation unit 32 may be configured to calculate a transmittance spectrum ST($\lambda$,xj) or ST($\lambda$,t,xj) of the measurement subject S at a position xj based on a first criterion spectrum St1($\lambda$,xj) or St1($\lambda$,t,xj) that is based on the measurement light travelling from one position xj in the measurement area R1, the second criterion spectrum St2($\lambda$) or St2($\lambda$,t), and a measurement spectrum Stm($\lambda$,xj) or Stm($\lambda$,t,xj) that is based on the measurement light travelling from the position xj.

The following will describe another embodiment of the present invention with reference to the drawings. Note that, in the drawings, the same reference numerals are given to the same or corresponding components in the drawings, and redundant descriptions thereof are not repeated.

Second Embodiment

In contrast with the optical measurement apparatus 101 according to the first embodiment, the present embodiment relates to an optical measurement apparatus 102 that receives the reflection light travelling from the target area R as a result of the target area R being irradiated with irradiation light, and generates a reflectance spectrum of the measurement subject S for each wavelength based on the result of reception of the reflection light. The optical measurement apparatus 102 is the same as the optical measurement apparatus 101 according to the first embodiment except for the contents described below.

Optical Measurement Apparatus

Figure 12:
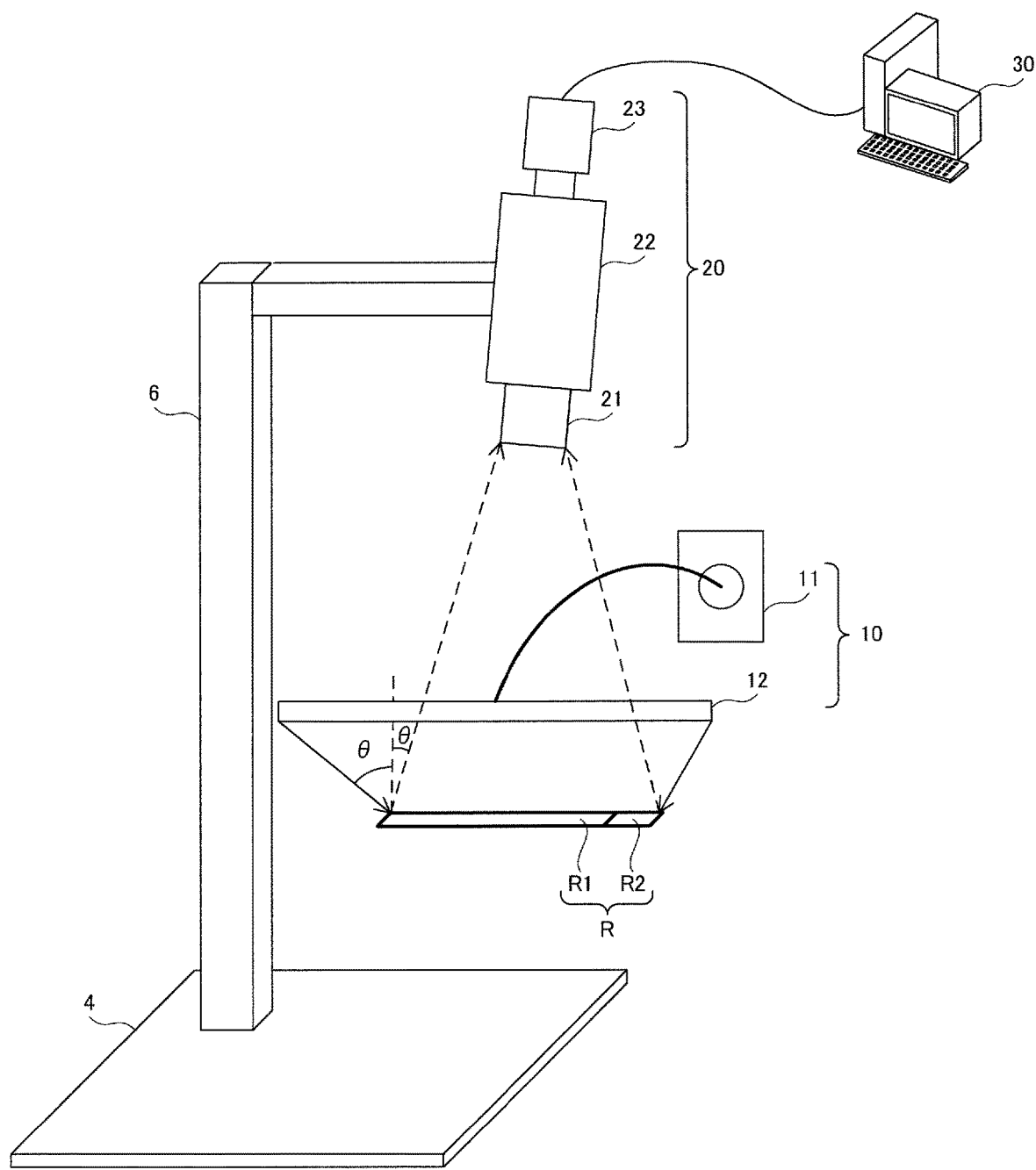
FIG. 12 is a diagram showing an example of a configuration of the optical measurement apparatus according to the second embodiment of the present invention.

FIG. 12 is a diagram showing an example of a configuration of the optical measurement apparatus according to the second embodiment of the present invention.

As shown in FIG. 12, the optical measurement apparatus 102 includes the irradiation optical system 10, the reception optical system 20, the processing device 30, the base member 4, and the support member 6. The base member 4 and the support member 6 fix the reception optical system 20. Note that the optical measurement apparatus 102 is not limited to having a configuration that includes the base member 4 and the support member 6, and may include other members for fixing the reception optical system 20 instead of the base member 4 and the support member 6 or in addition to the base member 4 and the support member 6.

Figure 13:
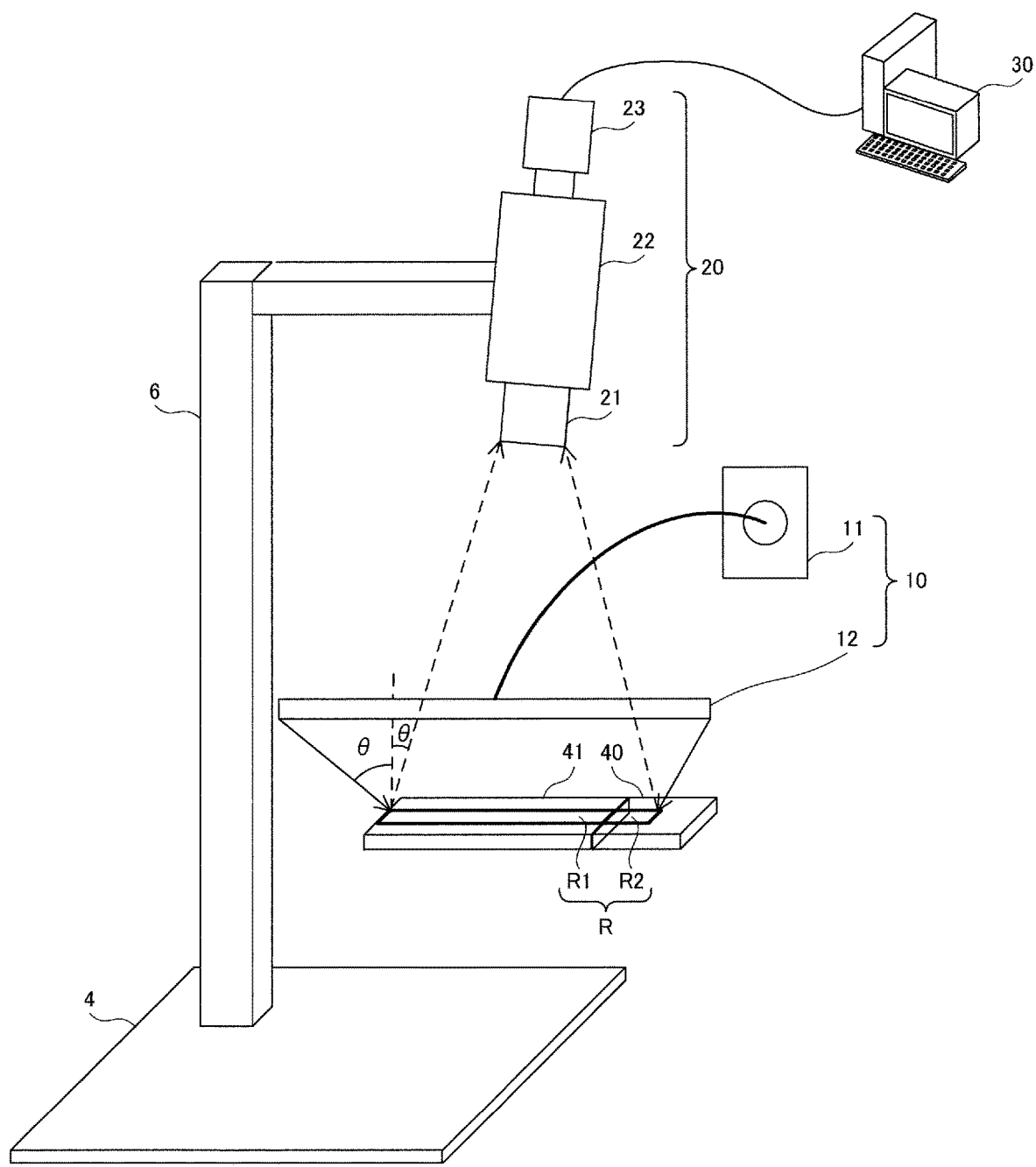
FIG. 13 is a diagram showing an example of the configuration of the optical measurement apparatus according to the second embodiment of the present invention.

FIG. 13 is a diagram showing an example of the configuration of the optical measurement apparatus according to the second embodiment of the present invention. FIG. 13 shows a state in which a reflection plate 41 is provided on the measurement area R1 and a reflection plate 40 is provided on the non-measurement area R2.

The reflection plates 40 and 41 are glass plates, Si plates, or aluminum mirrors, for example. For example, the reflectance of the reflection plate 40 and the reflectance of the reflection plate 41 are substantially the same. The reflection plate 40 and the reflection plate 41 may be integrated into one reflection plate.

Figure 14:
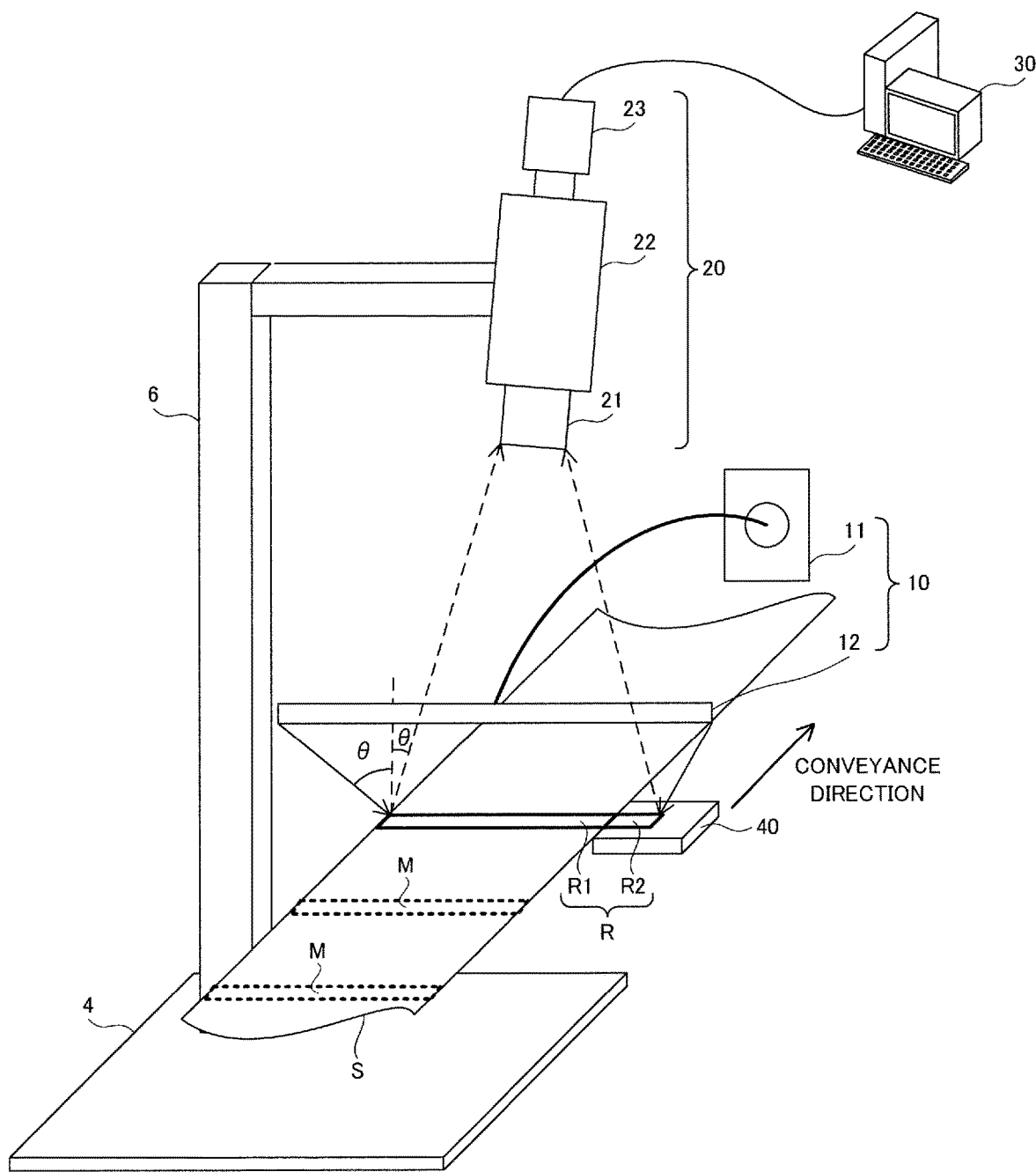
FIG. 14 is a diagram showing an example of the configuration of the optical measurement apparatus according to the second embodiment of the present invention.

FIG. 14 is a diagram showing an example of the configuration of the optical measurement apparatus according to the second embodiment of the present invention. FIG. 14 shows a state in which the measurement subject S that is the subject of measurement performed by the optical measurement apparatus 102 is placed.

As shown in FIG. 14, the optical measurement apparatus 102 measures the reflectance spectrum of the measurement subject S placed on the measurement area R1 in a state where the reflection plate 40 is placed on the non-measurement area R2.

For example, in a production line of the measurement subject S, the optical measurement apparatus 102 automatically measures the reflectance spectrum of the measurement subject S that is conveyed through the measurement area R1, at the plurality of measurement positions M. That is to say, the optical measurement apparatus 102 performs in-line measurement of the reflectance spectrum at the plurality of measurement positions M on the measurement subject S.

More specifically, the optical measurement apparatus 102 periodically performs reflectance measurement, for example, to calculate the reflectance for each wavelength at the measurement positions M on the measurement subject S that is conveyed.

Irradiation Optical System

The irradiation optical system 10 irradiates, in a straight direction, the target area R that includes the measurement area R1 and the non-measurement area R2 that is an area different from the measurement area R1, with irradiation light that includes a plurality of wavelengths.

The line light guide 12 of the irradiation optical system 10 is provided such that the incident angle of the irradiation light incident onto the measurement subject S placed on the measurement area R1 is $\theta$.

Reception Optical System

The reception optical system 20 receives measurement light that is the reflection light travelling from the target area R as a result of the target area R being irradiated with irradiation light.

The reception optical system 20 is located at a position that is on the same side as the line light guide 12 with respect to the measurement subject S and at which the reception optical system 20 can receive reflection light reflected from the measurement subject S at the reflection angle $\theta$.

The reception optical system 20 receives, as measurement light, reflection light reflected from the target area R, of the irradiation light emitted from the line light guide 12. Specifically, the reception optical system 20 receives reflection light from the measurement subject S placed on the measurement area R1, of the irradiation light emitted from the line light guide 12.

Processing Device

The calculation unit 32 of the processing device 30 generates a reception light spectrum $S(\lambda)$ that indicates the relationship between a wavelength $\lambda$ and the intensity of measurement light, for each position in the target area R, based on the result of reception of the measurement light performed by the reception optical system 20. Thereafter, the calculation unit 32 calculates the reflectance of the measurement subject S placed on the measurement area R1, for each wavelength, based on the reception light spectrum $S(\lambda)$ thus generated.

More specifically, the calculation unit 32 generates the reception light spectrum $S(\lambda)$ based on the two-dimensional image data stored in the storage unit 33, and calculates the reflectance of the measurement subject S for each wavelength $\lambda$, based on the reception light spectrum $S(\lambda)$ thus generated.

The calculation unit 32 calculates the reflectance spectrum of the measurement subject S based on a first criterion spectrum $Sr1(\lambda)$ that is the reception light spectrum $S(\lambda)$ that is based on the measurement light travelling from the measurement area R1 when the measurement subject S is not present on the measurement area R1 and the reflection plate 41 is present on the measurement area R1, a second criterion spectrum $Sr2(\lambda)$ that is the reception light spectrum $S(\lambda)$ that is based on the measurement light travelling from the non-measurement area R2 when the reflection plate 40 is present on the non-measurement area R2, as shown in FIG. 13, and the measurement spectrum $Srm(\lambda)$ that is the reception light spectrum $S(\lambda)$ that is based on the measurement light travelling from the measurement area R1 when the measurement subject S is present on the measurement area R1, as shown in FIG. 14.

For example, the calculation unit 32 calculates a plurality of first criterion spectra $Sr1(\lambda,X)$ that are respectively based on the rays of measurement light travelling from the plurality of measurement points X in the measurement area R1 when the measurement subject S is not present on the measurement area R1 and the reflection plate 41 is present on the measurement area R1.

Thereafter, the calculation unit 32 calculates the reflectance spectrum of the measurement subject S based on the plurality of first criterion spectra $Sr1(\lambda,X)$ thus generated, the second criterion spectrum $Sr2(\lambda)$, and a plurality of measurement spectra $Srm(\lambda,X)$ that are respectively based on the rays of measurement light travelling from the plurality of measurement points X.

For example, the calculation unit 32 calculates the reflectance distribution of the measurement subject S at the measurement positions M based on the first criterion spectra $Sr1(\lambda,X)$, the second criterion spectrum $Sr2(\lambda)$, and the measurement spectra $Srm(\lambda,X)$.

For example, the second criterion spectrum $Sr2(\lambda)$ is a spectrum generated by the calculation unit 32 in advance based on the measurement light travelling from the non-measurement area R2 when the measurement subject S is not present on the measurement area R1.

The first criterion spectra $Sr1(\lambda,X)$ and the second criterion spectrum $Sr2(\lambda)$ are spectra generated by the calculation unit 32 respectively based on the measurement light travelling from the measurement area R1 and the measurement light travelling from the non-measurement area R2 received by the reception optical system 20 at the same point in time when the measurement subject S has not been present on the measurement area R1.

More specifically, the first criterion spectra $Sr1(\lambda,X)$ and the second criterion spectrum $Sr2(\lambda)$ are spectra generated by the calculation unit 32 respectively based on the reflection light from the measurement area R1 and the reflection light from the non-measurement area R2 received by the reception optical system 20 as a result of the target area R being irradiated by the irradiation optical system 10 with irradiation light in a state where the measurement subject S is not present on the measurement area R1 and the reflection plate 41 and the reflection plate 40 are respectively present on the measurement area R1 and the non-measurement area R2 as shown in FIG. 13.

For example, in a state where in-line measurement of the reflectance distribution of the measurement subject S has not been started and the reflection plates 40 and 41 are placed on the target area R, the optical measurement apparatus 102 generates the first criterion spectra $Sr1(\lambda,X)$ and the second criterion spectrum $Sr2(\lambda)$ based on the reflection light from the reflection plate 41 and the reflection plate 40 received by the reception optical system 20 as a result of the target area R being irradiated by the irradiation optical system 10 with irradiation light.

The calculation unit 32 calculates the reflectance spectrum of the measurement subject S further based on a reference spectrum $Srr(\lambda)$ that is a reception light spectrum that is based on the measurement light travelling from the non-measurement area R2 when the measurement subject S is present on the measurement area R1.

The reference spectrum $Srr(\lambda)$ and the measurement spectra $Srm(\lambda,X)$ are, for example, spectra generated by the calculation unit 32 respectively based on the measurement light travelling from the non-measurement area R2 and the measurement light travelling from the measurement area R1 received by the reception optical system 20 at the same point in time when the measurement subject S is present on the measurement area R1.

More specifically, the reference spectrum $Srr(\lambda)$ and the measurement spectra $Srm(\lambda,X)$ are spectra generated by the calculation unit 32 respectively based on the reflection light from the non-measurement area R2, i.e. from the reflection plate 40, and the reflection light from the measurement area R1, i.e. from the measurement subject S, received by the reception optical system 20 as a result of the target area R being irradiated by the irradiation optical system 10 with irradiation light in a state where the measurement subject S is present on the measurement area R1 as shown in FIG. 14.

For example, after in-line measurement of the reflectance distribution of the measurement subject S has been started, in a state where the measurement subject S is placed instead of the reflection plate 41 on the measurement area R1, the calculation unit 32 generates the reference spectrum $Srr(\lambda)$ and the measurement spectra $Srm(\lambda,X)$ based on the reflection light from the non-measurement area R2 and the reflection light from the measurement area R1 received by the reception optical system 20 at the same point in time as a result of the target area R being irradiated by the irradiation optical system 10 with irradiation light.

For example, the storage unit 33 stores intensity ratios $Pr(\lambda,X)$ that are ratios between first criterion spectra $Sr1(\lambda,t,X)$ and second criterion spectrum $Sr2(\lambda,t)$ generated at the measurement points X for wavelengths A at a certain point t in time (t=t0) before the start of in-line measurement. The intensity ratios $Pr(\lambda,X)$ are expressed by Formula (4) below.

[Math. 4]
$$Pr(\lambda, X) = \frac{Sr1(\lambda, t, X)}{Sr2(\lambda, t)} \quad (4)$$

Upon generating measurement spectra Srm(λ,t,X) and a reference spectrum Srr(λ,t) at a certain point t in time (t=t1) after the start of in-line measurement, the calculation unit 32 acquires the intensity ratios Pr(λ,X) stored in the storage unit 33, and calculates reflectance spectra SR(λ,t,X) that indicate the reflectances of the measurement subject S at the plurality of measurement points X, as expressed by Formula (6) below, using the virtual reference spectra Srv(λ,t,X) expressed by Formula (5) below.

[Math. 5]
$$Srv(\lambda, t, X) = Srr(\lambda, t) \times Pr(\lambda, X) \quad (5)$$

[Math. 6]
$$SR(\lambda, t, X) = \frac{Srm(\lambda, t, X)}{Srv(\lambda, t, X)} \quad (6)$$

For example, the calculation unit 32 calculates the film thickness distribution that indicates the film thickness of the measurement subject S at the measurement points X, based on the reflectance spectra SR(λ,t,X) thus calculated. Alternatively, the calculation unit 32 calculates the hue of the measurement subject S based on the reflectance spectra SR(λ,t,X) thus calculated.

Although the line light guide 12 of the irradiation optical system 10 in the optical measurement apparatus 102 according to the second embodiment of the present invention is provided such that the incident angle of the irradiation light incident onto the measurement subject S placed on the measurement area R1 is θ, the present invention is not limited to such a configuration.

Also, although the reception optical system 20 in the optical measurement apparatus 102 according to the second embodiment of the present invention is located at a position that is on the same side as the line light guide 12 with respect to the measurement subject S and at which the reception optical system 20 can receive reflection light reflected from the measurement subject S at the reflection angle θ, the present invention is not limited to such a configuration.

Figure 15:
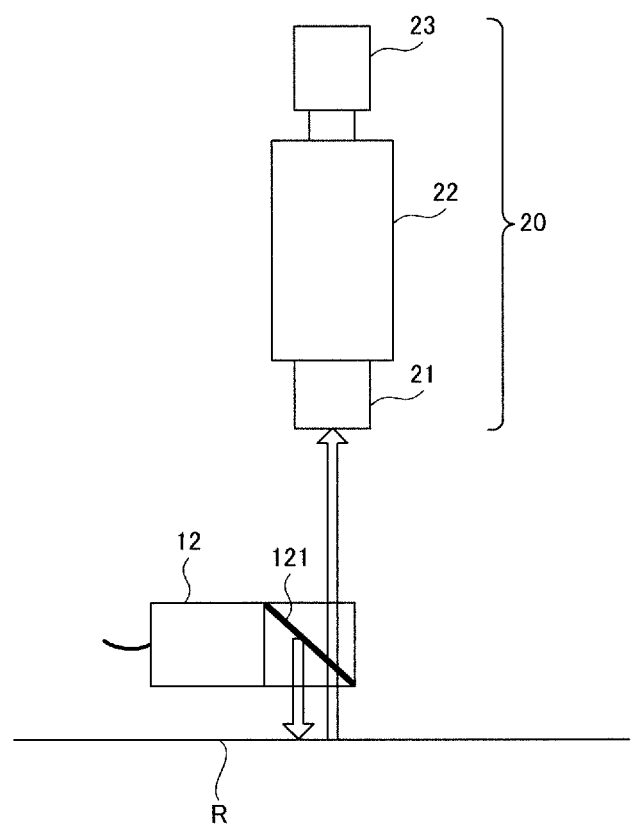
FIG. 15 is a diagram showing an example of the configuration of the optical measurement apparatus according to a modification of the second embodiment of the present invention.

FIG. 15 is a diagram showing an example of the configuration of the optical measurement apparatus according to a modification of the second embodiment of the present invention.

As shown in FIG. 15, the line light guide 12 has a half mirror 121. The line light guide 12 irradiates the target area R with the irradiation light reflected from the half mirror 121. In this case, for example, the line light guide 12 is provided immediately above the surface on which the measurement subject S is conveyed, such that the incident angle of the irradiation light incident onto the measurement subject S placed on the measurement area R1 is 0°. That is to say, the irradiation optical system 10 of the optical measurement apparatus 102 is a coaxial epi-illumination system.

The reception optical system 20 receives the reflection light travelling from the target area R as a result of the target area R being irradiated with irradiation light, via the half mirror 121. In this case, for example, the reception optical system 20 is located at a position where the reception optical system 20 can receive the reflection light reflected from the measurement subject S at a reflection angle of 0°, i.e. at a position where the reception optical system 20 faces the target area R with the line light guide 12 being interposed therebetween.

The foregoing embodiments are to be construed in all respects as illustrative and not restrictive. The scope of the present invention is defined by the claims rather than the description above, and is intended to include all modifications within the meaning and scope of the claims and equivalents thereof.

What is claimed is:

1. An optical measurement apparatus comprising:
    an irradiation optical system configured to irradiate, in a straight direction, a target area that includes a measurement area and a non-measurement area that is an area different from the measurement area, with irradiation light that includes a plurality of wavelengths;
    a reception optical system configured to receive measurement light that is transmission light or reflection light travelling from the target area as a result of the target area being irradiated with the irradiation light; and
    a calculation unit configured to generate a reception light spectrum that indicates a relationship between a wavelength and an intensity of the measurement light, for each position in the target area, based on a result of reception of the measurement light performed by the reception optical system, and calculate, for each wavelength, a transmittance or a reflectance of a measurement subject that is placed on the measurement area, based on the reception light spectrum thus generated,
    wherein the calculation unit calculates a transmittance spectrum or a reflectance spectrum of the measurement subject based on a first criterion spectrum that is the reception light spectrum that is based on the measurement light travelling from the measurement area when the measurement subject is not present on the measurement area, a second criterion spectrum that is the reception light spectrum that is based on the measurement light travelling from the non-measurement area, and a measurement spectrum that is the reception light spectrum that is based on the measurement light travelling from the measurement area when the measurement subject is present on the measurement area.

2. The optical measurement apparatus according to claim 1,
    wherein the second criterion spectrum is a spectrum generated by the calculation unit in advance based on the measurement light travelling from the non-measurement area when the measurement subject is not present on the measurement area, and
    the calculation unit calculates the transmittance spectrum or the reflectance spectrum of the measurement subject further based on a reference spectrum that is the reception light spectrum that is based on the measurement light travelling from the non-measurement area when the measurement subject is present on the measurement area.

3. The optical measurement apparatus according to claim 2,
    wherein the reference spectrum and the measurement spectrum are spectra generated by the calculation unit respectively based on the measurement light travelling from the non-measurement area and the measurement light travelling from the measurement area received by the reception optical system at the same point in time when the measurement subject is present on the measurement area.

4. The optical measurement apparatus according to claim 1,
wherein the first criterion spectrum and the second criterion spectrum are spectra generated by the calculation unit respectively based on the measurement light travelling from the measurement area and the measurement light travelling from the non-measurement area received by the reception optical system at the same point in time when the measurement subject has not been present on the measurement area.

5. The optical measurement apparatus according to claim 1,
wherein the calculation unit calculates the transmittance spectrum or the reflectance spectrum of the measurement subject based on the plurality of first criterion spectra that are respectively based on the rays of measurement light travelling from a plurality of positions on the measurement area when the measurement subject is not present on the measurement area, the second spectrum, and the plurality of measurement spectra that are respectively based on the rays of measurement light travelling from the plurality of positions.

6. An optical measurement method comprising,
a step of irradiating, in a straight direction, a target area that includes a measurement area and a non-measurement area that is an area different from the measurement area, with irradiation light that includes a plurality of wavelengths;
a step of receiving measurement light that is transmission light or reflection light travelling from the target area as a result of the target area being irradiated with the irradiation light; and
a step of generating a reception light spectrum that indicates a relationship between a wavelength and an intensity of the measurement light, for each position in the target area, based on a result of reception of the measurement light, and calculating, for each wavelength, a transmittance or a reflectance of a measurement subject that is placed on the measurement area, based on the reception light spectrum thus generated,
wherein, in the step of calculating the transmittance or the reflectance, a transmittance spectrum or a reflection spectrum of the measurement subject is calculated based on a first criterion spectrum that is the reception light spectrum that is based on the measurement light travelling from the measurement area when the measurement subject is not present on the measurement area, a second criterion spectrum that is the reception light spectrum that is based on the measurement light traveling from the non-measurement area, and a measurement spectrum that is the reception light spectrum that is based on the measurement light travelling from the measurement area when the measurement subject is present on the measurement area.

* * * * *